United States Patent

[11] 3,590,611

[72] Inventor Yoshikatu Nakashima
 Nagoya-shi, Japan
[21] Appl. No 801,944
[22] Filed Feb. 25, 1969
[45] Patented July 6, 1971
[73] Assignee Kabushiki Kaisha Tokai Rika Denki
 Seisakusho
 Aichi-ken, Japan

[54] LOCKING DEVICE
 1 Claim, 10 Drawing Figs.
[52] U.S. Cl. .................................................. 70/186,
 70/252
[51] Int. Cl. ................................................... B60r 25/02
[50] Field of Search ........................................ 70/186,
 252, 247, 248, 156, 157, 380

[56] References Cited
 UNITED STATES PATENTS
 2,991,643 7/1961 Hitt ............................ 70/380 X
 3,132,503 5/1964 Pieck et al. ................ 70/186

*Primary Examiner*—Albert G. Craig, Jr.
*Attorney*—Otto John Munz

ABSTRACT: A locking device of the cylinder type for a steering column in automobiles, in which a locking bolt does not protrude to a position where it engages the steering column even when a rotatable cylinder of the lock is turned to a locking position by a key. Even in the locking position the key inserted into the rotatable cylinder and protruded partly therefrom keeps its engagement with an engaging means mounted on a sliding member which in turn suppresses the movement of an extension integrally made with the locking bolt.

INVENTOR
YOSHIKATU NAKASHIMA
BY
ATTORNEY

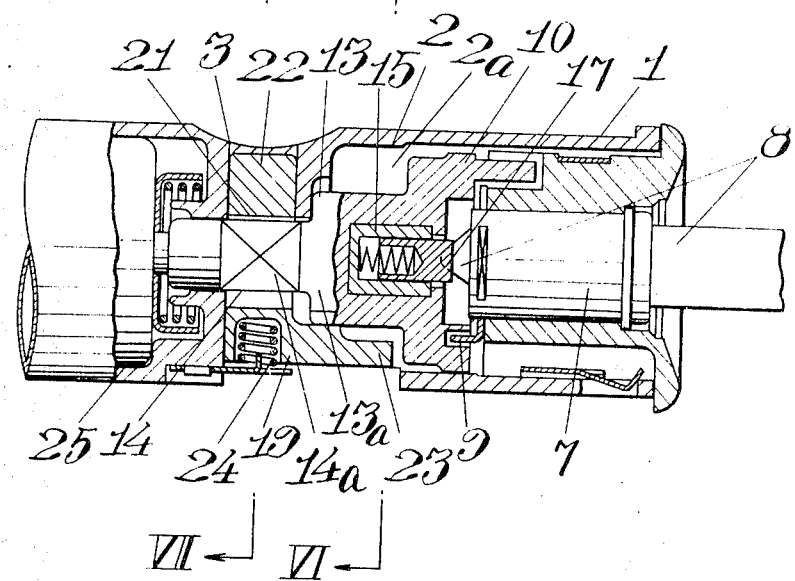
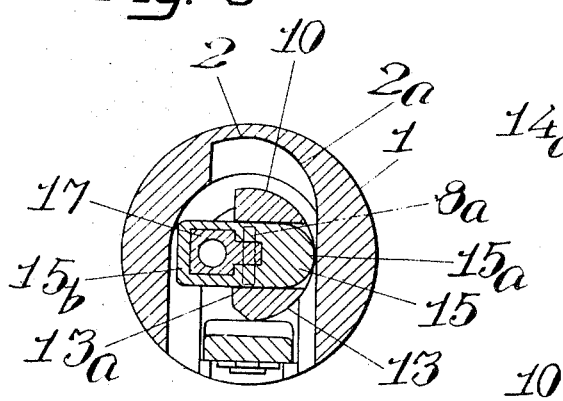
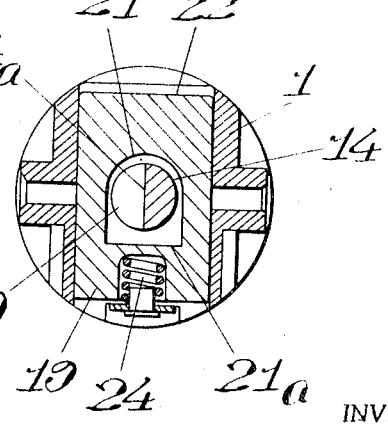

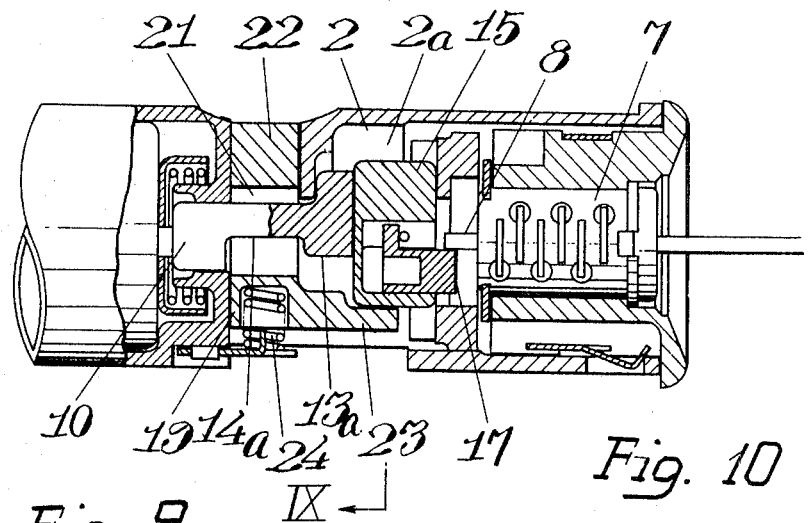
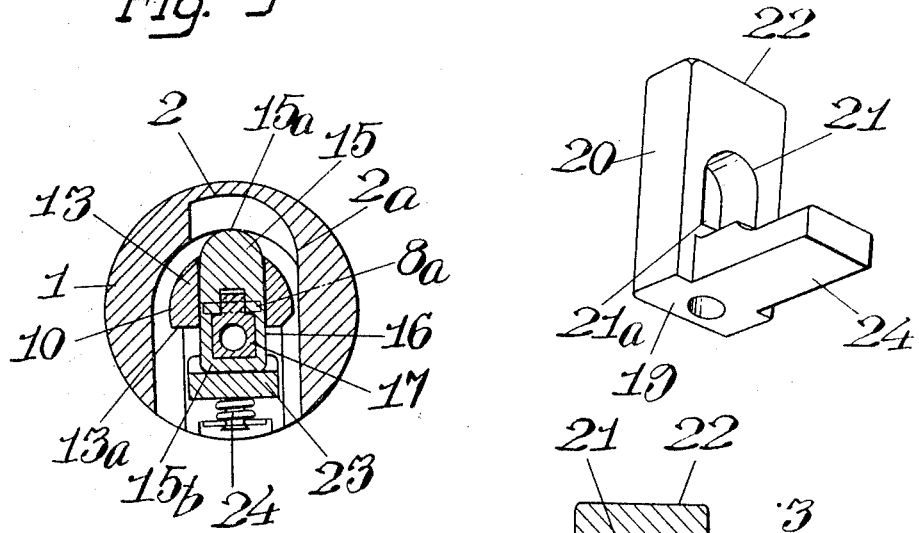
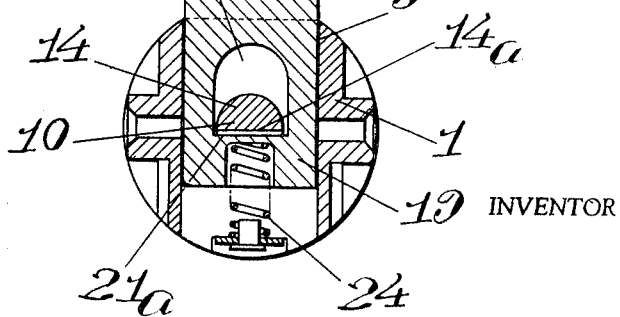

LOCKING DEVICE

This invention relates to an improvement of a locking device of the cylinder type for a steering column in automobiles, in which a locking bolt does not protrude to a position where it engages the steering column even when a rotatable cylinder of the lock is turned to a locking position by a key.

In the accompanying drawing a preferred embodiment of the present invention is illustrated;

FIG. 4 is similarly a sectional view taken along IV-IV line in FIG. 1,

FIG. 5 is a sectional plan view of the device wherein the lock is kept off,

FIG. 6 is a sectional view taken along VI-VI line in FIG. 5,

FIG. 7 is similarly a sectional view taken along VII-VII line in FIG. 5,

FIG. 8 is a sectional plan view wherein the lock is in an operative position but the key is still in the rotatable cylinder, FIG. 9 is a sectional view taken along IX-IX line in FIG. 8, and FIG. 10 is a perspective view of the lock bolt employed in the present invention locking device.

Figure 1:
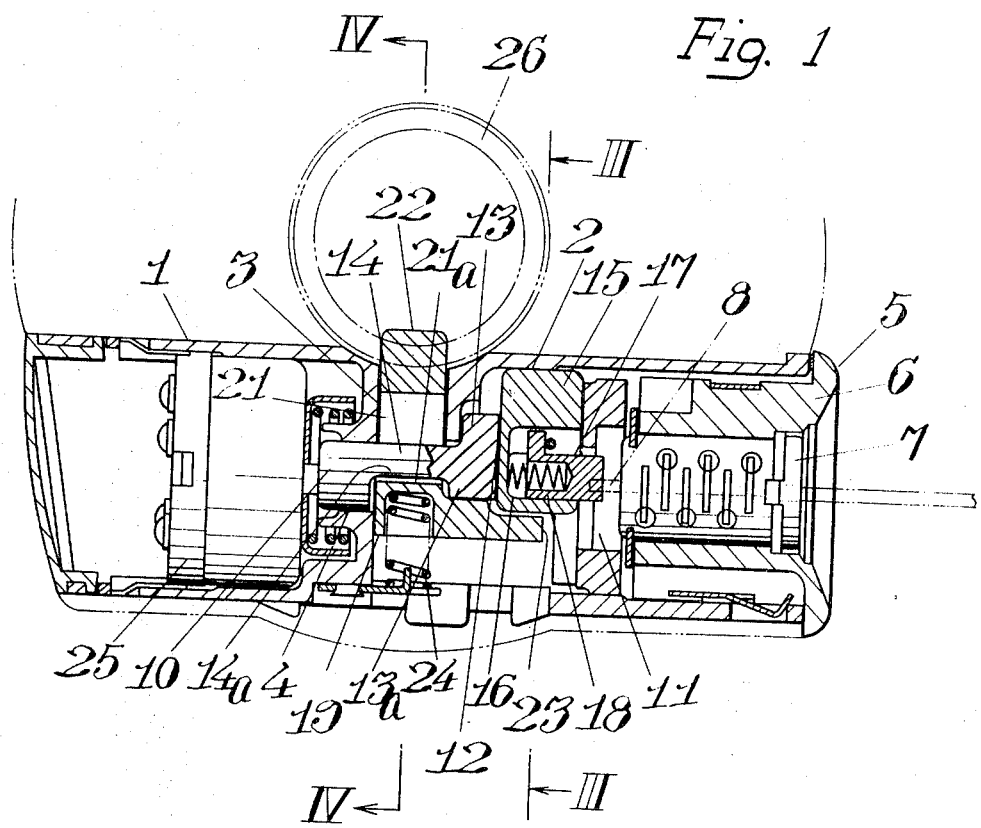
FIG. 1 is a sectional plan view of the device.
Figure 2:
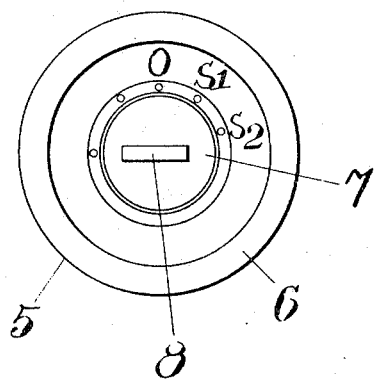
FIG. 2 is an elevational view of FIG. 1.

Now, the invention is explained in detail hereinafter with reference to the accompanying drawing. A lock 5 of the cylinder type which may be operated by a corresponding key 8 has a rotatable cylinder 7 and an outer casing 6, and it is insertedly fitted into a cylindrical holder 1. Said rotatable cylinder 7 can take a locking position L and a nonlocking position L which is separated from the locking position by an angular distance of 90°. The cylinder can be turned further clockwise 35° to an ignition position $S_1$ and with additional 35° to a starter position $S_2$. A rear portion of the holder 1 is reduced at its diameter to form a bearing 4 in which the rear end of a controlling shaft 10 is rotatably carried. The front end of the controlling shaft engages at its eccentric position the rotatable cylinder 7 by means of a key 9 provided to cooperate with said shaft, so that it can rotate coaxially with the movement of the rotatable cylinder 7. A concaved portion 11 is provided centrally at the front end of the shaft and a slot 12 is further provided to the shaft in the rear of said concaved portion and diametrically thereof. A comparatively large primary cam 13 having a semicircular outer cam face is associated with the controlling shaft 10 rearwardly next to the slot 12, and a comparatively small secondary semicircular cam 14 is formed on the shaft next to said primary cam. An opening 3 for the movement of a bolt 19 is provided on the circumferential outer wall of the holder 1 at a position corresponding to the secondary semicircular cam 14. It is provided that when the rotatable cylinder 7 is turned to the locking position L illustrated in FIGS. 1 and 8, the primary and secondary semicircular cams 13 and 14 move to positions where their linearly cut off edge surface 13a and 14a come angularly in direction opposite to the off-locking position O. The slot 12 is arranged to cooperate with the shaft whereby it makes a right angle to the linearly cut off edge surface 13a. The opening 3 for the movement of the bolt 19 is formed in the angular direction of the locking-off position. To a sliding member 15 slidingly mounted in the slot 12, there is a rectangular hole 16 having an opening toward the concaved portion 11. Portion 11 which is mounted to an engaging means 17 is biased toward the rotatable cylinder 7 by a spring loaded to the back of said engaging means.

Inside the holder 1 at a position corresponding to the location of the sliding member 15 and in the same direction to the opening 3, there is formed a concaved portion 2, the distance of which is gradually reduced until 90 degrees clockwise from the off-locking position O to form a cam face 2a. The locking bolt 19 which has an L-shaped configuration has a tongue portion 20. Portion 20 is provided with an engaging opening 21 which receives the cooperating secondary semicircular cam 14 and a top end 22 which is protrusibly faced to the opening 3. The said engaging opening 21 has a linear edge 21a which is brought into contact with the linearly cut off edge surface 14a of the secondary semicircular cam 14 when it is turned to the locking position L. The extension 23 which laterally extends from the tongue portion 20 passes by the outer circumferential wall of the primary semicircular cam 13 and reaches the position where it can engage the sliding member 15. The numeral 24 is a spring by which the bolt 19 is biased toward the opening 3. An ignition switch, the movable portion of which is fitted to the rearmost end of the controlling shaft 10 is represented by the numeral 25.

With the constructions as above explained, the present invention locking device operates as follows.

Figure 3:
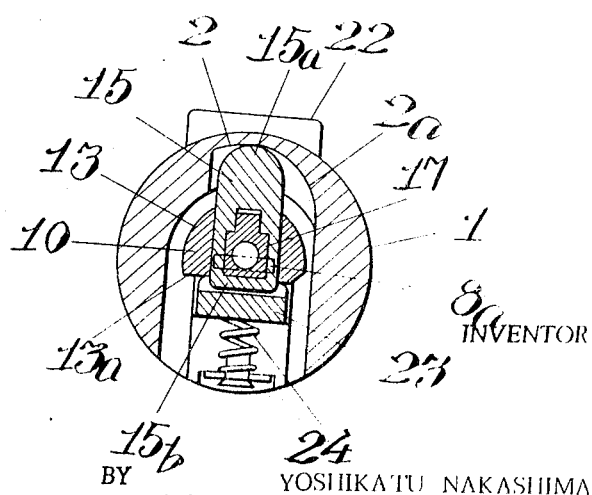
FIG. 3 is a sectional view taken along III-III line in FIG. 1.

When that the rotatable cylinder 7 and the controlling shaft 10 are turned angularly to the locking position L and the key 8 is inserted into the cylinder, as illustrated in FIG. 1, the linearly cut off edge surface 14a of the secondary semicircular cam 14 meets the linear edge 21a of the engaging opening 21 of the locking bolt 19. The linearly cut off edge surface 13a of the primary semicircular cam 13 cooperates with the extension 23, whereby the locking bolt 19 is pushed by the spring 24. A top end 22 thereof protrudes from the opening 3 to engage with the steering column 26 and prevents it from rotating, as best shown in FIGS. 1 and 3. The extension 23 pushes the sliding member 15 at its end 15b so that the other end 15a comes into contact with the concaved portion 2 of the cylindrical holder 1, whereby the end surface of the sliding member 17 is moved to the position corresponding to the key hole 8a of the rotatable cylinder 7, as best shown in FIG. 9.

When the key 8 is inserted into the cylinder 7 its forward end comes into contact with the sliding member 17 at its end surface. The key is then turned from the position illustrated in FIG. 1 to 90° in clockwise direction. The extension 23 of the bolt 19 is pushed by the shoulder of the primary semicircular cam 13, whereby the bolt 19 moves against the force given by the spring 24 and its top end 22 retarts into the holder from the opening 3, resulting in releasing the locking of the steering column. Simultaneously with this movement of the bolt, the cam face 2a of the holder 1 pushes the sliding member 15 at its end 15a to cause it move inside the sliding slot 12. The engaging means 17 comes in contact with the key 8 and the key hole 8a, as shown in FIGS. 5—7. Thereby the engaging means becomes free from the pressure exerted on it by the forward end of key 8 and slightly protrudes by the resiliency of the spring 18 so that it can engage with the end of the key 8 along its side.

When the rotatable cylinder 7 is turned with the shaft 10 to the locking position L from the nonlocking position shown in FIGS. 5 to 7, the forward end of the key 8 is located engageably with the forward side of the engaging means 17. The said means and the sliding member 15 can not move toward the key. The engagement of the shoulder of the primary semicircular cam 13 with the extension 23 of the bolt 19 thereby released. Almost simultaneously the sliding member 15 which is restricted in its linear movement by the key then starts to rotate and comes to contact with the extension 23 of the bolt, in place of the cam 13 which had been in contact with the extension, as shown in FIGS. 8 and 9. Though the locking bolt 19 is ready to protrude by making the linear edge 21a of its engaging opening 21 confront the linearly cut off edge surface 14a of the secondary semicircular cam 14 and also making its extension 23 confront the linearly cut off edge surface 13a of the primary semicircular cam 13, the bolt can not enter into the locking operation since the sliding member 15 is not movable due to the engagement of the engaging means 17 with the key 8. Thus, and the end 15b of the sliding member prevents the extension 23 from advancing.

When the key is taken off from the locking device under the aforementioned condition, the engaging member 17 disengages from the key and the sliding member 15 become free to move. Thereby the locking bolt 19 advances by the resiliency exerted by the spring 24 to make its top end 22 protrude from the device and simultaneously makes the extension 23 push the one end 15b of the sliding member 15 so that the other end 15a comes into contact with the concaved portion 2 of the holder 1.

As described in detail above, the present invention provides a locking device for a steering column in automobiles comprising a lock of the cylinder type having a rotatable cylinder reciprocably rotatable by a corresponding key within the range of at least 90° a controlling shaft moves almost 7 coaxially with the rotatable cylinder. One of the limits of the range of 90° is a locking position and another limit is a lock releasing position A sliding member is slidably inserted into the controlling shaft in its diametrical direction. The said member is able to move in the protruding direction of the undermentioned locking bolt at the locking position and is forced to retract in the direction opposite to the aforementioned direction at the lock releasing position. A semicircular cam portion is formed on the controlling shaft and is provided with a flat face joining ends of the semicircular cam face. The said flat face confronts the undermentioned extension of the locking bolt. An engaging means is mounted on the sliding member and is siliently biased toward the rotatable cylinder. The forward end of said means engaging the forward side of the key when the sliding member moves to the retarding position retarding the locking bolt at the locking position of the controlling shaft and contacts with the forward end of the key when the sliding member moves to the protruding position of the locking bolt. The locking bolt is displaceable radially with reference to the axial direction of the controlling shaft and has a spring biasing the bolt towards the protruding locking position and the extension is engageable with the semicircular cam portion and the sliding member at the side opposite to the protruding position of the locking bolt.

It shall be noted that the interaction of the semicircular cam portion 13 of the controlling shaft 10, the sliding member 15 carried by said shaft and provided with the engaging means 17, the extension 23 extending from the locking bolt 19, the spring 24 loaded to the bolt 19 and other related members are important in the present invention device. To wit, the engaging means 17 moves integrally with the sliding member 15 as to keep its side aside the forward end of the key 8 so when the controlling shaft 10 is at the off position, and even when said shaft is turned to the locking position, the key 8 keeps its engagement with the engaging means 17 and prevents the sliding member 15 from returning back, whereby the movement of the bolt 19 toward its protruding direction by the spring 24 is also indirectly controlled by the key since the movement of the extension 23 integrally provided to the bolt is suppressed by the sliding member which is kept motionless by said key. The sliding member 15 becomes free to slide only when the key 8 is taken off and simultaneously the bolt 19 protrudes outwardly by the spring 24. The said bolt coincidentally causes the shift of the sliding member 15 by its extension 23. It shall be appreciated that the present invention can readily afford very accurate movements to locking devices of the instant type in which the locking bolt is ready to move into the protruding position at the locking position but does not protrude unless the key is taken off.

I claim:

1. A locking device for a steering column in an automobile comprising a casing adapted to be secured to said column; a key-activated rotatable lock in said casing; a bolt member slidably arranged within said casing and having an extension thereof; said lock being of the cylinder type and having a rotatable cylinder reciprocably and rotatably operated by the corresponding key; a controlling shaft movably mounted coaxially with the rotatable cylinder, one of the limits of rotation being a locking position and another limit being a lock releasing position; a sliding member slidably inserted into the controlling shaft in its diametrical direction, said sliding member being adapted to protrude in the protruding direction of the said locking bolt at the locking position and being forced to by camming engagement with said casing to retract as said cylinder is rotated to the lock releasing position; a semicircular cam portion formed on the controlling shaft and provided with a flat face joining ends of the semicircular cam face, said flat face confronting the said extension of the locking bolt when said cylinder is in the locking position; an engaging means mounted on the sliding member and resiliently biased toward the cylinder, the forward end of said means engaging a side of the key when the sliding member is in the retracted position at the locking position of the controlling shaft and contacting with the forward end of the key when the sliding member is in the protruding position; and the locking bolt being displaceable radially with reference to the axial direction of the controlling shaft and having a spring biasing the bolt towards a protruding locking position and the said extension being engageable with the semicircular cam portion and the sliding member at the side opposite to the protruding position of the locking bolt.